United States Patent
Wan (10) Patent No.: US 12,306,746 B2
(45) Date of Patent: May 20, 2025

(54) METHOD AND APPARATUS FOR UPDATING RAID 5 CHECK VALUE, AND MEDIUM

(71) Applicant: INSPUR ELECTRONIC INFORMATION INDUSTRY CO., LTD., Shandong (CN)

(72) Inventor: Xiang Wan, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 18/272,144

(22) PCT Filed: Jan. 26, 2022

(86) PCT No.: PCT/CN2022/074066
§ 371 (c)(1),
(2) Date: Jul. 13, 2023

(87) PCT Pub. No.: WO2022/179377
PCT Pub. Date: Sep. 1, 2022

(65) Prior Publication Data
US 2024/0143495 A1   May 2, 2024

(30) Foreign Application Priority Data
Feb. 25, 2021 (CN) .......................... 202110211375.2

(51) Int. Cl.
*G06F 12/02*    (2006.01)
(52) U.S. Cl.
CPC .............. *G06F 12/0223* (2013.01)

(58) Field of Classification Search
CPC .... G06F 12/0223; G06F 3/061; G06F 3/0619; G06F 3/0659; G06F 3/0689;
(Continued)

(56) References Cited

U.S. PATENT DOCUMENTS

| 6,282,671 | B1 | 8/2001 | Islam et al. | |
| 2019/0019095 | A1* | 1/2019 | Mietke | G06F 16/2358 |

(Continued)

FOREIGN PATENT DOCUMENTS

| CN | 1118503 A | 3/1996 |
| CN | 106788468 A | 5/2017 |

(Continued)

OTHER PUBLICATIONS

Long Yang. "Design and Implementation of workload-adaptive RAIS-5 system." A dissertation for master's degree. Graduate School of Natonal University of Defense Technology. Apr. 2015.

*Primary Examiner* — Nanci N Wong
(74) *Attorney, Agent, or Firm* — IPro, PLLC (57) ABSTRACT

Disclosed in the embodiments of the present application are a method and apparatus for updating a RAID 5 check value, and a medium. The method includes: acquiring an update instruction for a data stripe, where the update instruction is carried with new state values of data blocks to be updated; searching an established rule library for a matched check value update rule according to a proportion of all the data blocks to be updated in the data stripe and a usage state of the data stripe; and processing the new state values of the data blocks to be updated by using the check value update rule to obtain a new check value of the data stripe.

18 Claims, 2 Drawing Sheets

(58) Field of Classification Search
CPC .... G06F 11/1076; G06F 3/0607; G06F 3/064; Y02D 10/00
See application file for complete search history.

(56) References Cited

U.S. PATENT DOCUMENTS

2020/0174689 A1* 6/2020 Hutchison ............. G06F 3/0689
2021/0255940 A1* 8/2021 Kamran ............. G06F 11/2094

FOREIGN PATENT DOCUMENTS

| CN | 108717383 | A | 10/2018 |
|---|---|---|---|
| CN | 108776665 | A | 11/2018 |
| CN | 110147289 | A | 8/2019 |
| CN | 110568993 | A | 12/2019 |
| CN | 110618895 | A | 12/2019 |
| CN | 112947858 | A | 6/2021 |
| WO | 2014010077 | A1 | 1/2014 |

* cited by examiner

METHOD AND APPARATUS FOR UPDATING RAID 5 CHECK VALUE, AND MEDIUM

CROSS-REFERENCE TO RELATED APPLICATION

The present disclosure claims priority to Chinese patent application No. 202110211375.2, titled "METHOD AND APPARATUS FOR UPDATING RAID 5 CHECK VALUE, AND MEDIUM", filed on Feb. 25, 2021 before the CNIPA, China National Intellectual Property Administration, which is incorporated herein in its entirety by reference.

TECHNICAL FIELD

The present disclosure relates to the technical field of storage devices, in particular to a method, an apparatus and a computer-readable storage medium for updating a RAID 5 check value.

BACKGROUND

RAID (Redundant Arrays of Independent Disks) 5 is a storage solution that combines storage performance, data security and storage cost. RAID 5 may be understood as a compromise between RAID 0 and RAID 1. RAID 5 provides data security for the system. RAID 5 has a data reading speed similar to that of RAID 0, only with the parity information being added, and writes data at a speed slightly slower than that of writing on a single disk. Moreover, since a plurality of data corresponds to one piece of parity information, the disk space utilization rate of RAID 5 is higher than that of RAID 1, and the storage cost is relatively low. Therefore, RAID 5 is a solution applied more at present.

As can be seen, a problem to be solved by those skilled in the art is how to improve the updating efficiency of a RAID 5 check value.

SUMMARY

Embodiments of the present disclosure provide a method for updating a RAID 5 check value, including:
  acquiring an update instruction for a data stripe, and the update instruction is carried with new state values of data blocks to be updated;
  searching an established rule library for a matched check value update rule according to a proportion of all the data blocks to be updated in the data stripe and a usage state of the data stripe; and
  processing the new state values of the data blocks to be updated by using the check value update rule to obtain a new check value of the data stripe.

In an embodiment, the rule library includes: a first check value update rule corresponding to a situation where the proportion is zero and the data stripe has not been used; a second check value update rule corresponding to a situation where the proportion is zero and the data stripe has been used; a third check value update rule corresponding to a situation where the proportion is not zero and satisfies a pre-set condition; a fourth check value update rule corresponding to a situation where the proportion is not zero and does not satisfy the pre-set condition; the first check value update rule means that the new check value of the data stripe is determined according to new state values of all the data blocks to be updated; the second check value update rule means that the new check value of the data stripe is determined according to an original check value of the data stripe and the new state values of all the data blocks to be updated; the third check value update rule means that the new check value of the data stripe is determined according to state values of data blocks not required to be updated in the data stripe and the new state values of all the data blocks to be updated; the fourth check value update rule means that the new check value of the data stripe is determined according to the original check value of the data stripe, original state values of all the data blocks to be updated and the new state values of all the data blocks to be updated.

In an embodiment, the searching an established rule library for a matched check value update rule according to a proportion of all the data blocks to be updated in the data stripe and a usage state of the data stripe includes:
  acquiring the first check value update rule from the rule library in response to determining that all the data blocks to be updated are null in the data stripe and the data stripe has not been used;
  acquiring the second check value update rule from the rule library in response to determining that all the data blocks to be updated are null in the data stripe and the data stripe has been used;
  counting a first number of data blocks to be updated being null in the data stripe and a second number of data blocks to be updated being not null in the data stripe in response to determining that not all the data blocks to be updated are null in the data stripe;
  acquiring the third check value update rule from the rule library in response to the first number being less than or equal to the second number; and
  acquiring the fourth check value update rule from the rule library in response to the first number being greater than the second number.

In an embodiment, in response to the check value update rule being the first check value update rule, the processing the new state values of the data blocks to be updated by using the check value update rule to obtain a new check value of the data stripe includes:
  performing an XOR operation on the new state values of all the data blocks to be updated, and taking a result of the operation as the new check value of the data stripe.

In an embodiment, in response to the check value update rule being the second check value update rule, the processing the new state values of the data blocks by using the check value update rule to obtain a new check value of the data stripe includes:
  acquiring the original check value of the data stripe; and
  performing an XOR operation on the original check value and the new state values of all the data blocks to be updated, and taking a result of the operation as the new check value of the data stripe.

In an embodiment, in response to the check value update rule being the third check value update rule, the processing the new state values of the data blocks by using the check value update rule to obtain a new check value of the data stripe includes:
  acquiring state values of data blocks not required to be updated in the data stripe; and
  performing an XOR operation on the state values of the data blocks not required to be updated in the data stripe and the new state values of all the data blocks to be updated in the data stripe, and taking a result of the operation as the new check value of the data stripe.

In an embodiment, in response to the check value update rule being the fourth check value update rule, the processing the new state values of the data blocks by using the check value update rule to obtain a new check value of the data stripe includes:

acquiring the original check value of the data stripe and the original state values of all the data blocks to be updated; and performing an XOR operation on the original check value of the data stripe, the original state values of all the data blocks to be updated and the new state values of all the data blocks to be updated, and taking a result of the operation as the new check value of the data stripe.

Embodiments of the present disclosure further provide an apparatus for updating a RAID 5 check value, including an acquisition unit, a search unit, and a processing unit;

the acquisition unit is configured to acquire an update instruction for a data stripe, wherein the update instruction is carried with new state values of data blocks to be updated;

the search unit is configured to search an established rule library for a matched check value update rule according to a proportion of all the data blocks to be updated in the data stripe and a usage state of the data stripe; and the processing unit is configured to process the new state values of the data blocks to be updated by using the check value update rule to obtain a new check value of the data stripe.

In an embodiment, the rule library includes: a first check value update rule corresponding to a situation where the proportion is zero and the data stripe has not been used; a second check value update rule corresponding to a situation where the proportion is zero and the data stripe has been used; a third check value update rule corresponding to a situation where the proportion is not zero and satisfies a pre-set condition; a fourth check value update rule corresponding to a situation where the proportion is not zero and does not satisfy the pre-set condition; the first check value update rule means that the new check value of the data stripe is determined according to new state values of all the data blocks to be updated; the second check value update rule means that the new check value of the data stripe is determined according to an original check value of the data stripe and the new state values of all the data blocks to be updated; the third check value update rule means that the new check value of the data stripe is determined according to state values of data blocks not required to be updated in the data stripe and the new state values of all the data blocks to be updated; the fourth check value update rule means that the new check value of the data stripe is determined according to the original check value of the data stripe, original state values of all the data blocks to be updated and the new state values of all the data blocks to be updated.

In an embodiment, the search unit includes a first acquisition subunit, a second acquisition subunit, a statistics subunit, a third acquisition subunit and a fourth acquisition subunit;

the first acquisition subunit is configured to acquire the first check value update rule from a rule library in response to determining that all the data blocks to be updated in the data stripe are null and the data stripe has not been used;

the second acquisition subunit is configured to acquire the second check value update rule from the rule library in response to determining that all the data blocks to be updated in the data stripe are null and the data stripe has been used;

the statistical subunit is configured to count a first number of data blocks to be updated that are null in the data stripe and a second number of data blocks to be updated that are not null in the data stripe when not all the data blocks to be updated are null in the data stripe;

the third acquisition subunit is configured to acquire the third check value update rule from the rule library in response to the first number being less than or equal to the second number;

the fourth acquisition subunit is configured to acquire the fourth check value update rule from the rule library in response to the first number being greater than the second number.

In an embodiment, when the check value update rule is the first check value update rule, the processing unit is configured to perform an XOR operation on the new state values of all data blocks to be updated, and take a result of the XOR operation as the new check value of the data stripe.

In an embodiment, when the check value update rule is the second check value update rule, the processing unit is configured to acquire the original check value of the data stripe; perform an XOR operation on the original check value and the new state values of all the data blocks to be updated, and take a result of the operation as the new check value of the data stripe.

In an embodiment, when the check value update rule is the third check value update rule, the processing unit is configured to acquire state values of data blocks not required to be updated in the data stripe; and perform an XOR operation on state values of data blocks not required to be updated in the data stripe and the new state values of all the data blocks to be updated, and take a result of the operation as a new check value of the data stripe.

In an embodiment, when the check value update rule is the fourth check value update rule, the processing unit is configured to acquire the original check value of the data stripe and the original state values of all the data blocks to be updated; perform an XOR operation on the original check value of the data stripe, the original state values of all the data blocks to be updated and the new state values of all the data blocks to be updated, and take a result of the operation as the new check value of the data stripe.

Embodiments of the present disclosure further provide an apparatus for updating a RAID 5 check value, including a memory and one or more processors, the memory is stored with computer-readable instructions that, when executed by the one or more processors, cause the one or more processors to perform steps of the method described above.

Embodiments of the present disclosure still provide one or more non-volatile computer-readable storage media storing computer-readable instructions that, when executed by one or more processors, cause the one or more processors to perform steps of the method described above.

Details of one or more embodiments of the present disclosure are set forth in the accompanying drawings and the description below. Other features and advantages of the present disclosure will be apparent from the specification, drawings and claims.

BRIEF DESCRIPTION OF THE DRAWINGS

In order to more clearly illustrate embodiments of the present disclosure, figures that are required to describe the embodiments will be briefly introduced below. Apparently, the figures that are described below illustrates merely some embodiments of the present disclosure, and those skilled in the art may obtain other figures according to these figures without paying creative effort.

DETAILED DESCRIPTION

A clear and complete description of the technical solution of the embodiments of the present disclosure will be provided below in conjunction with the accompanying drawings of the embodiments of the present disclosure. Apparently, the embodiments described are only a part of the embodiments of the present disclosure, rather than all the embodiments. Based on the embodiments in the present disclosure, all other embodiments obtained by those skilled in the art without involving any creative effort should be within the scope of protection of the present disclosure.

In order to enable those skilled in the art to better understand the technical solution of the present disclosure, the present application is further described below in conjunction with the accompanying drawings and detailed implementations.

A RAID 5 array generally includes a plurality of data stripes, and each data stripe has a corresponding data block state vector table where a state value of each data block and a check value of the data stripe are recorded. When a data block in the data stripe has an anomaly, according to the check value and the state values of the remaining data blocks, the state value originally corresponding to the data block having the anomaly may be determined to determine whether the data block having the anomaly needs to be reconstructed. The check value is an important basis for performing data stripe recovery.

The inventors have realized that the determination of the check value in the conventional way is to perform an XOR operation on the state values of all the data blocks in the data stripe, the result of which is taken as the check value of the data stripe. After each read and write operation on data blocks, it is necessary to read the state values of all the data blocks in the data stripe again to determine a check value, and the calculation amount of updating the check value is generally large, resulting in a low efficiency of updating the check value.

Figure 1:
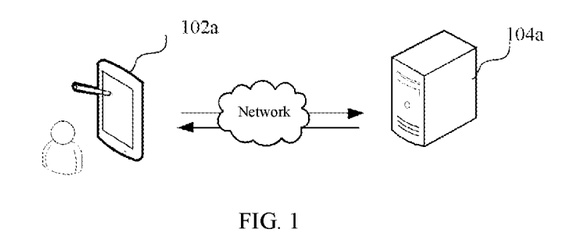
FIG. 1 is an application scenario diagram of a method for updating a RAID 5 check value according to one or more embodiments of the present disclosure.

The method for updating a RAID 5 check value provided in the present disclosure may be applied to an application environment as shown in FIG. 1, where a terminal device 102a communicates with a server 104a via a network. The terminal device 102a may be, but is not limited to, various personal computers, notebook computers, smart phones, tablets, and portable wearable devices, and the server 104a may be implemented as a stand-alone server or a server cluster composed of multiple servers.

In some embodiments, the terminal device 102a acquires an update instruction for a data stripe, and transmits the same to the server 104a, and the update instruction is carried with new state values of data blocks to be updated; after receiving the update instruction for the data stripe, the server 104a may search an established rule library for a matched check value update rule according to a proportion of all the data blocks to be updated in the data stripe and a usage state of the data stripe, and process the new state values of the data blocks to be updated using the check value update rule to obtain a new check value of the data stripe. Further, the server 104a may return the new check value of the data stripe to the terminal device 102a.

In another embodiment, the terminal device 102a acquires an update instruction for a data stripe, the update instruction being carried with new state values of data blocks to be updated, searches an established rule library for a matched check value update rule according to a proportion of all the data blocks to be updated in the data stripe and a usage state of the data stripe, and processes the new state values of the data blocks to be updated using the check value update rule to obtain a new check value of the data stripe.

Figure 2:
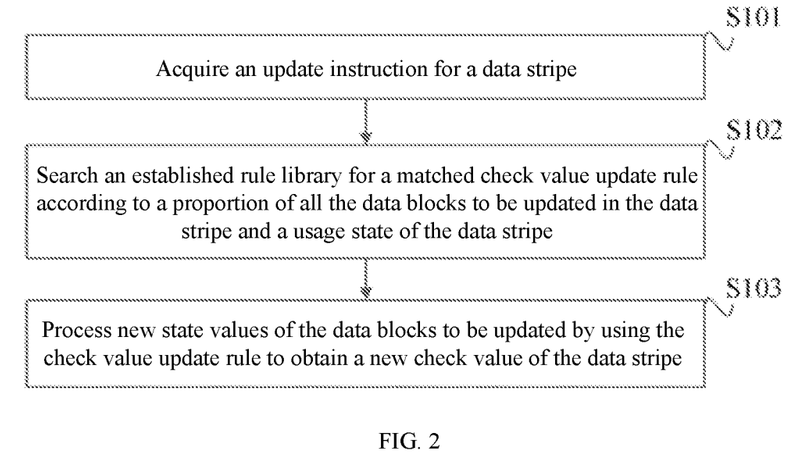
FIG. 2 is a flow diagram of a method for updating a RAID 5 check value according to one or more embodiments of the present disclosure.

Next, a method for updating a RAID 5 check value according to an embodiment of the present disclosure will be described in detail. FIG. 2 is a flow chart of a method for updating a RAID 5 check value according to an embodiment of the present disclosure. As an example, the method is illustrated when being applied to the terminal or server in FIG. 1, and includes steps described below.

At S101, an update instruction for a data stripe is acquired.

The update instruction is carried with new state values of data blocks to be updated.

A data stripe may include a plurality of data blocks. In practice, a state value may be used to characterize whether data is stored in a data block. For ease of description, in embodiments of the present disclosure, "1" and "0" are used as state values, e.g., "1" indicates that data is stored in the data block, and "0" indicates that no data is stored in the data block.

At S102, an established rule library is searched for a matched check value update rule according to a proportion of all the data blocks to be updated in the data stripe and a usage state of the data stripe.

Depending on different proportions of the data blocks to be updated in the data stripe and different usage states of the data stripe, check value updating manners will be different accordingly. In practice, corresponding check value updating manners under different proportions of data blocks to be updated in a data stripe and different usage states of the data stripe may be summarized in the form of rules to establish a rule library.

In practice, the rule library includes a first check value update rule corresponding to a situation where the proportion is zero and the data stripe has not been used; a second check value update rule corresponding to a situation where the proportion is zero and the data stripe has been used; a third check value update rule corresponding to a situation where the proportion is not zero and the proportion satisfies a pre-set condition; a fourth check value update rule corresponding to a situation where the proportion is not zero and the proportion does not satisfy the pre-set condition.

The proportion may be set according to the number of data blocks among the data blocks to be updated that have stored data in the data stripe. If the proportion is zero, it indicates that the data blocks to be updated have not stored data in the data stripe. If the proportion is not zero, it indicates that at least one data block to be updated has stored data in the data stripe.

Whether the proportion satisfies the pre-set condition may be set according to a ratio of the number of data blocks to be updated that are null in the data stripe to the number of data blocks to be updated that are not null in the data stripe. For example, the third check value update rule may be invoked when the number of data blocks to be updated that are null in the data stripe is less than or equal to the number of data blocks to be updated that are not null in the data stripe; the fourth check value update rule is invoked when the number of data blocks to be updated that are null in the data stripe is greater than the number of data blocks to be updated that are not null in the data stripe.

The first check value update rule means that a new check value of the data stripe is determined according to new state values of all the data blocks to be updated; the second check value update rule means that a new check value of the data stripe is determined according to the original check value of the data stripe and the new state values of all the data blocks to be updated; the third check value update rule means that a new check value of the data stripe is determined according to state values of data blocks not required to be updated in the data stripe and the new state values of all the data blocks to be updated in the data stripe; the fourth check value update rule means that a new check value of the data stripe is determined according to the original check value of the data stripe, the original state values of all the data blocks to be updated and the new state values of all the data blocks to be updated.

In a certain implementation, when an update instruction carrying new state values of data blocks to be updated is obtained, it may be determined whether all the data blocks to be updated are null in the data stripe. If all the data blocks to be updated are null in the data stripe, it indicates that the data blocks to be updated do not store data in the data stripe, that is, the proportion is zero, and at this time, it may be further determined whether the data stripe is used.

If all data blocks to be updated are null in the data stripe and the data stripe has not been used, the first check value update rule may be retrieved from the rule library. In details, the terminal device or the server determines whether all the data blocks to be updated are null in the data stripe and whether the data stripe is used. If it is determined that all the data blocks to be updated are null in the data stripe and the data stripe has not been used, then the first check value update rule is acquired from the rule library based on the determined result.

If all data blocks to be updated are null in the data stripe and the data stripe has been used, the second check value update rule is acquired from the rule library. In details, the terminal or the server determines whether all the data blocks to be updated are null in the data stripe and whether the data stripe is used. If it is determined that all the data blocks to be updated are null in the data stripe and the data stripe has been used, then the second check value update rule is acquired from the rule library based on the determined result.

If the data blocks to be updated are not all null in the data stripe, it indicates that the data blocks to be updated have data stored in the data stripe, i.e., the proportion is not zero, and at this time, data blocks to be updated that are null in the data stripe may be counted as a first number, and data blocks to be updated that are not null in the data stripe may be counted as a second number. In details, the terminal device or the server determines whether all the data blocks to be updated are null in the data stripe. If it is determined that all the data blocks to be updated are not all null in the data stripe, based on the determined result, a first number of the data blocks to be updated being null in the data stripe and a second number of the data blocks to be updated being not null in the data stripe may be counted.

If the first number is less than or equal to the second number, the third check value update rule is acquired from the rule library; if the first number is greater than the second number, the fourth check value update rule is acquired from the rule library.

At S103, new state values of the data blocks to be updated are processed by using the check value update rule, to obtain a new check value of the data stripe.

In combination with the above-mentioned four check value update rules, when the check value update rule is the first check value update rule, an XOR operation may be performed on the new state values of all the data blocks to be updated, and the operation result thereof is taken as the new check value of the data stripe.

Taking a data stripe including six data blocks as an example, the state values of the six data blocks are respectively represented by $d_0$ to $d_5$; $D_i$ represents a new state value of a data block to be updated; $P_0$ represents an original check value of the data stripe and $P_0'$ represents a new check value of the data stripe.

Assuming that the new state values for the data blocks currently to be updated are $D_0$ and $D_1$, it is indicated that the data blocks $d_0$ and $d_1$ need to be updated to $D_0$ and $D_1$. If the data blocks $D_0$ and $D_1$ to be updated have not stored data in the data stripe, and the data stripe has not been used, then a new check value may be calculated according to $P_0'=D_0\oplus D_1$, wherein $\oplus$ represents the XOR operation.

When the check value update rule is the second check value update rule, the original check value of the data stripe may be acquired; an XOR operation is performed on the original check value and the new state values of all the data blocks to be updated, and the operation result thereof is taken as the new check value of the data stripe.

Assuming that the new state values for the data blocks currently to be updated are $D_0$ and $D_1$, it is indicated that the data blocks $d_0$ and $d_1$ need to be updated to $D_0$ and $D_1$. If the data blocks $D_0$ and $D_1$ to be updated have not stored data in the data stripe, but the other data blocks in the data stripe have already been used, then a new check value may be calculated according to $P_0'=P_0\oplus D_0\oplus D_1$.

When the check value update rule is the third check value update rule, state values of data blocks not required to be updated in the data stripe may be acquired; and an XOR operation is performed on the state values of the data blocks not required to be updated in the data stripe and the new state values of all the data blocks to be updated, and the operation result thereof is taken as the new check value of the data stripe.

Assuming that the new state values for the data blocks currently to be updated are $D_0$ and $D_1$, it is indicated that the data blocks $d_0$ and $d_1$ need to be updated to $D_0$ and $D_1$. If at least one of data block $D_0$ and $D_1$ to be updated has stored data in the data stripe, and data is stored in a third data block in the data stripe, and the state value of the third data block is $d_2$, the number of data blocks to be updated that are null in the data stripe may be counted, and is represented by rcw; the number of data blocks to be updated that are not null in the data stripe is counted, represented by rmw. In this case, rcw≤rmw, and the new check value may be calculated according to $P_0'=d_2\oplus D_0\oplus D_1$.

When the check value update rule is the fourth check value update rule, the original check value of the data stripe and the original state values of all the data blocks to be updated may be acquired; an XOR operation is performed on the original check value of the data stripe, the original state values of all the data blocks to be updated and the new state values of all the data blocks to be updated, and the operation result thereof is taken as the new check value of the data stripe.

Assuming that the new state values for the data blocks currently to be updated are $D_0$ and $D_1$, it is indicated that the data blocks $d_0$ and $d_1$ need to be updated to $D_0$ and $D_1$. If at least one of the data blocks $D_0$ and $D_1$ to be updated has data stored in the data stripe, and all the data blocks in the data stripe have data stored therein. In this case, rcw>rmw, and the new check value may be calculated according to $P_0' = P_0 \oplus d_0 \oplus d_1 \oplus D_0 \oplus D_1$.

As can be seen from the above-mentioned technical solution, an update instruction of a data stripe is acquired, and the update instruction is carried with new state values of data blocks to be updated. Depending on different proportions of the data blocks to be updated in the data stripe and different usage states of the data stripe, check value updating manners will be different accordingly. In practice, corresponding check value updating manners under different proportions of data blocks to be updated in a data stripe and different usage states of the data stripe may be summarized in the form of rules to establish a rule library. According to the proportion of all the data blocks to be updated in the data stripe and the usage state of the data stripe, a matched check value update a rule may be queried from the established rule library; the new state values of the data blocks to be updated are processed using the check value update rule to obtain a new check value of the data stripe. Compared with the method for updating a check value of a data stripe based on state values of all data blocks in the related art, the present disclosure processes new state values of data blocks to be updated according to a check value update rule, and the update of the check value of the data stripe may be realized, and the present disclosure reduces the calculation amount of the check value update and improves the efficiency of the check value update.

Figure 3:
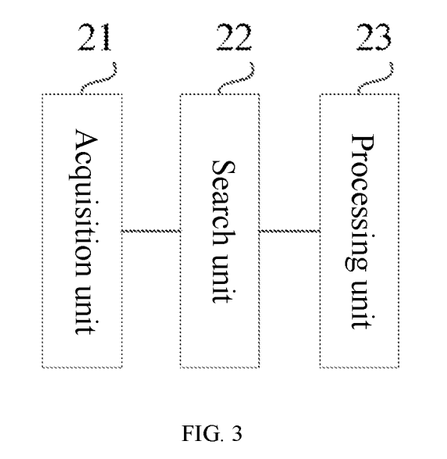
FIG. 3 is a schematic structural diagram of an apparatus for updating a RAID 5 check value according to one or more embodiments of the present disclosure.

FIG. 3 is a schematic structural diagram illustrating an apparatus for updating a RAID 5 check value according to an embodiment of the present disclosure. The apparatus includes an acquisition unit 21, a search unit 22 and a processing unit 23.

The acquisition unit 21 is configured to acquire an update instruction for a data stripe, and the update instruction is carried with new state values of data blocks to be updated.

The search unit 22 is configured to search an established rule library for a matched check value update rule according to a proportion of all the data blocks to be updated in the data stripe and a usage state of the data stripe.

The processing unit 23 is configured to process new state values of the data blocks to be updated by using the check value update rule, and obtain a new check value of the data stripe.

In an embodiment, the rule library includes a first check value update rule corresponding to a situation where the proportion is zero and the data stripe has not been used; a second check value update rule corresponding to a situation where the proportion is zero and the data stripe has been used; a third check value update rule corresponding to a situation where the proportion is not zero and the proportion satisfies a pre-set condition; and a fourth check value update rule corresponding to a situation where the proportion is not zero and the proportion does not satisfy the pre-set condition.

The first check value update rule means that a new check value of the data stripe is determined according to new state values of all the data blocks to be updated; the second check value update rule means that a new check value of the data stripe is determined according to the original check value of the data stripe and the new state values of all the data blocks to be updated; the third check value update rule means that a new check value of the data stripe is determined according to state values of data blocks not required to be updated in the data stripe and the new state values of all the data blocks to be updated in the data stripe; the fourth check value update rule means that a new check value of the data stripe is determined according to the original check value of the data stripe, the original state values of all the data blocks to be updated and the new state values of all the data blocks to be updated.

In an embodiment, the search unit includes a first determination subunit, a second determination subunit, a first acquisition subunit, a second acquisition subunit, a statistics subunit, a third acquisition subunit and a fourth acquisition subunit.

The first determination subunit is configured to determine whether all the data blocks to be updated are null in the data stripe.

The second determination subunit is configured to determine whether the data stripe has been used in response to determining that all the data blocks to be updated are null in the data stripe.

The first acquisition subunit is configured to acquire the first check value update rule from a rule library in response to determining that the data stripe has not been used.

The second acquisition subunit is configured to acquire the second check value update rule from the rule library in response to determining that the data stripe has been used.

The statistical subunit is configured to count a first number of data blocks to be updated that are null in the data stripe and a second number of data blocks to be updated that are not null in the data stripe when all the data blocks to be updated are not null in the data stripe.

The third acquisition subunit is configured to acquire the third check value update rule from the rule library in response to the first number being less than or equal to the second number.

The fourth acquisition subunit is configured to acquire the fourth check value update rule from the rule library in response to the first number being greater than the second number.

In an embodiment, when the check value update rule is the first check value update rule, the processing unit is configured to perform an XOR operation on the new state values of all data blocks to be updated accordingly, and take the result of the XOR operation as the new check value of the data stripe.

In an embodiment, when the check value update rule is the second check value update rule, accordingly, the processing unit is configured to acquire the original check value of the data stripe; perform an XOR operation on the original check value and the new state values of all the data blocks to be updated, and take the operation result as the new check value of the data stripe.

In an embodiment, when the check value update rule is the third check value update rule, accordingly, the processing unit is configured to acquire state values of data blocks not required to be updated in the data stripe; and perform an XOR operation on state values of data blocks not required to be updated in the data stripe and the new state values of all the data blocks to be updated, and take the operation result as a new check value of the data stripe.

In an embodiment, when the check value update rule is the fourth check value update rule, accordingly, the processing unit is configured to acquire the original check value of the data stripe and the original state values of all the data blocks to be updated; perform an XOR operation on the original check value of the data stripe, the original state values of all the data blocks to be updated and the new state values of all the data blocks to be updated, and take the operation result as the new check value of the data stripe.

The description of the features in the embodiment corresponding to FIG. 3 may be made with reference to the description of the embodiment corresponding to FIG. 2 and will not be repeated here.

As can be seen from the above-mentioned technical solution, an update instruction of a data stripe is acquired, and the update instruction is carried with new state values of data blocks to be updated. Depending on different proportions of the data blocks to be updated in the data stripe and different usage states of the data stripe, check value updating manners will be different accordingly. In practice, corresponding check value updating manners under different proportions of data blocks to be updated in a data stripe and different usage states of the data stripe may be summarized in the form of rules to establish a rule library. According to the proportion of all the data blocks to be updated in the data stripe and the usage state of the data stripe, a matched check value update a rule may be queried from the established rule library; the new state values of the data blocks to be updated are processed using the check value update rule to obtain a new check value of the data stripe. Compared with the method for updating a check value of a data stripe based on state values of all data blocks in the related art, the present disclosure processes new state values of data blocks to be updated according to a check value update rule, and the update of the check value of the data stripe may be realized, and the present disclosure reduces the calculation amount of the check value update and improves the efficiency of the check value update.

Figure 4:
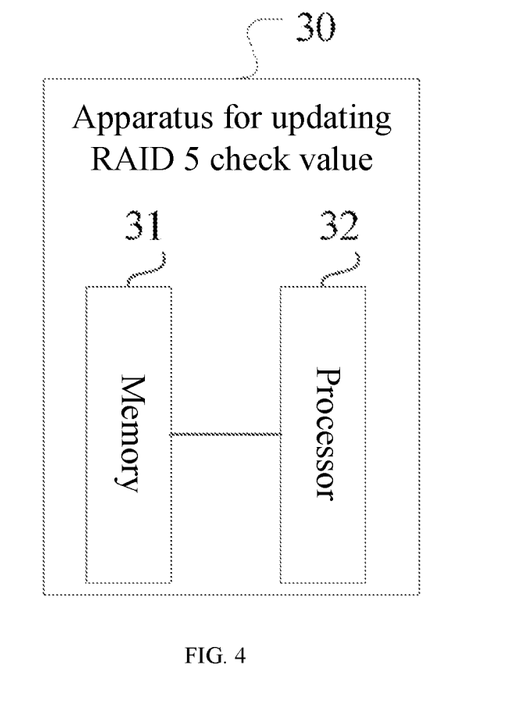
FIG. 4 is a schematic structural diagram of an apparatus for updating a RAID 5 check value according to one or more embodiments of the present disclosure.

FIG. 4 is a schematic diagram illustrating a hardware structure of an apparatus 30 for updating a RAID 5 check value according to an embodiment of the present disclosure. The apparatus 30 for updating a RAID 5 check value may be a computer device, the computer device may be a terminal device or a server, and the apparatus 30 for updating a RAID 5 check value includes:

a memory 31 for storing computer-readable instructions; and one or more processors 32 for executing memory-stored computer-readable instructions that, when executed by a processor, may implement the steps of the method for updating a RAID 5 check value as described in any of the embodiments above.

Embodiments of the present disclosure also provide a non-volatile readable storage medium having stored therein computer-readable instructions that, when executed by one or more processors, perform the steps of the method for updating a RAID 5 check value as described in any of the embodiments above. Those skilled in the art can understand that all or part of the processes in the methods of the above embodiments can be implemented by instructing relevant hardware based on computer-readable instructions, and the computer-readable instructions can be stored in a non-volatile computer readable storage medium. The computer-readable instructions, when executed, may include the processes of the foregoing method embodiments. Any reference to memory, storage, database or other medium used in the various embodiments provided in the present disclosure may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, RAM is available in various forms such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct Rambus dynamic RAM (DRDRAM), and Rambus dynamic RAM (RDRAM), etc.

The technical features of the above embodiments can be combined arbitrarily. For the sake of brevity, all possible combinations of the technical features in the above embodiments are not described. However, a combination of these technical features is considered to be within the scope disclosed in this specification as long as there is no contradiction in the combination of these technical features.

The above-mentioned embodiments only represent several embodiments of the present application, and the descriptions thereof are specific and detailed, but should not be construed as a limitation on the scope of the present disclosure. It should be pointed out that for those skilled in the art, without departing from the concept of the present disclosure, several modifications and improvements can be made, which all belong to the protection scope of the present disclosure. Therefore, the scope of protection of the present disclosure is defined by the appended claims.

The invention claimed is:

1. A method for updating a redundant arrays of independent disks (RAID) 5 check value, comprising:

acquiring an update instruction for a data stripe, wherein the update instruction is carried with new state values of data blocks to be updated;

searching an established rule library for a matched check value update rule according to a proportion of all the data blocks to be updated in the data stripe and a usage state of the data stripe; and processing the new state values of the data blocks to be updated by using the check value update rule to obtain a new check value of the data stripe;

wherein the rule library comprises: a first check value update rule corresponding to a situation where the proportion is zero and the data stripe has not been used; a second check value update rule corresponding to a situation where the proportion is zero and the data stripe has been used; a third check value update rule corresponding to a situation where the proportion is not zero and satisfies a pre-set condition; a fourth check value update rule corresponding to a situation where the proportion is not zero and does not satisfy the pre-set condition;

wherein the first check value update rule means that the new check value of the data stripe is determined according to new state values of all the data blocks to be updated; the second check value update rule means that the new check value of the data stripe is determined according to an original check value of the data stripe and the new state values of all the data blocks to be updated; the third check value update rule means that the new check value of the data stripe is determined according to state values of data blocks not required to be updated in the data stripe and the new state values of all the data blocks to be updated; the fourth check value update rule means that the new check value of the data stripe is determined according to the original check value of the data stripe, original state values of all the data blocks to be updated and the new state values of all the data blocks to be updated.

2. The method for updating a RAID 5 check value according to claim 1, wherein the searching an established rule library for a matched check value update rule according to a proportion of all the data blocks to be updated in the data stripe and a usage state of the data stripe comprises:
   acquiring the first check value update rule from the rule library in response to determining that all the data blocks to be updated are null in the data stripe and the data stripe has not been used;
   acquiring the second check value update rule from the rule library in response to determining that all the data blocks to be updated are null in the data stripe and the data stripe has been used;
   counting a first number of data blocks to be updated being null in the data stripe and a second number of data blocks to be updated being not null in the data stripe in response to determining that not all the data blocks to be updated are null in the data stripe;
   acquiring the third check value update rule from the rule library in response to the first number being less than or equal to the second number; and
   acquiring the fourth check value update rule from the rule library in response to the first number being greater than the second number.

3. The method for updating a RAID 5 check value according to claim 2, wherein in response to the check value update rule being the first check value update rule, the processing the new state values of the data blocks to be updated by using the check value update rule to obtain a new check value of the data stripe comprises:
   performing an XOR operation on the new state values of all the data blocks to be updated, and taking a result of the operation as the new check value of the data stripe.

4. The method for updating a RAID 5 check value according to claim 2, wherein in response to the check value update rule being the second check value update rule, the processing the new state values of the data blocks by using the check value update rule to obtain a new check value of the data stripe comprises:
   acquiring the original check value of the data stripe; and
   performing an XOR operation on the original check value and the new state values of all the data blocks to be updated, and taking a result of the operation as the new check value of the data stripe.

5. The method for updating a RAID 5 check value according to claim 2, wherein in response to the check value update rule being the third check value update rule, the processing the new state values of the data blocks by using the check value update rule to obtain a new check value of the data stripe comprises:
   acquiring state values of data blocks not required to be updated in the data stripe; and
   performing an XOR operation on the state values of the data blocks not required to be updated in the data stripe and the new state values of all the data blocks to be updated in the data stripe, and taking a result of the operation as the new check value of the data stripe.

6. The method for updating a RAID 5 check value according to claim 2, wherein in response to the check value update rule being the fourth check value update rule, the processing the new state values of the data blocks by using the check value update rule to obtain a new check value of the data stripe comprises:
   acquiring the original check value of the data stripe and the original state values of all the data blocks to be updated; and
   performing an XOR operation on the original check value of the data stripe, the original state values of all the data blocks to be updated and the new state values of all the data blocks to be updated, and taking a result of the operation as the new check value of the data stripe.

7. The method for updating a RAID 5 check value according to claim 1, wherein the data stripe comprises a plurality of data blocks, the state value is used for characterizing whether data is stored in the data block.

8. The method for updating a RAID 5 check value according to claim 1, wherein the rule library is established by summarizing corresponding check value updating manners under different proportions of data blocks to be updated in the data stripe and different usage states of the data stripe in a form of rules.

9. The method for updating a RAID 5 check value according to claim 1, wherein the proportion being zero means that the data blocks to be updated have not stored data in the data stripe, and the proportion being not zero means that at least one of the data blocks to be updated has stored data in the data stripe.

10. The method for updating a RAID 5 check value according to claim 2, wherein determining that all the data blocks to be updated are null in the data stripe and the data stripe has not been used comprises:
   determining whether all the data blocks to be updated are null in the data stripe;
   in response to determining that all the data blocks to be updated are null in the data stripe, determining whether the data stripe has been used.

11. A non-transitory computer-readable storage medium storing computer-readable instructions that, when executed by one or more processors, cause the one or more processors to perform operations of:
   acquiring an update instruction for a data stripe, wherein the update instruction is carried with new state values of data blocks to be updated;
   searching an established rule library for a matched check value update rule according to a proportion of all the data blocks to be updated in the data stripe and a usage state of the data stripe; and
   processing the new state values of the data blocks to be updated by using the check value update rule to obtain a new check value of the data stripe;
   wherein the rule library comprises: a first check value update rule corresponding to a situation where the proportion is zero and the data stripe has not been used; a second check value update rule corresponding to a situation where the proportion is zero and the data stripe has been used; a third check value update rule corresponding to a situation where the proportion is not zero and satisfies a pre-set condition; a fourth check value update rule corresponding to a situation where the proportion is not zero and does not satisfy the pre-set condition;
   wherein the first check value update rule means that the new check value of the data stripe is determined according to new state values of all the data blocks to be updated; the second check value update rule means that the new check value of the data stripe is determined according to an original check value of the data stripe and the new state values of all the data blocks to be updated; the third check value update rule means that the new check value of the data stripe is determined according to state values of data blocks not required to be updated in the data stripe and the new state values of all the data blocks to be updated; the fourth check value update rule means that the new check value of the data stripe is determined according to the original check value of the data stripe, original state values of all the data blocks to be updated and the new state values of all the data blocks to be updated.

12. An apparatus for updating a redundant arrays of independent disks (RAID) 5 check value, comprising a memory and one or more processors, the memory is stored with computer-readable instructions that, when executed by the one or more processors, cause the one or more processors to perform operations of:

acquiring an update instruction for a data stripe, wherein the update instruction is carried with new state values of data blocks to be updated;

searching an established rule library for a matched check value update rule according to a proportion of all the data blocks to be updated in the data stripe and a usage state of the data stripe; and processing the new state values of the data blocks to be updated by using the check value update rule to obtain a new check value of the data stripe;

wherein the rule library comprises: a first check value update rule corresponding to a situation where the proportion is zero and the data stripe has not been used; a second check value update rule corresponding to a situation where the proportion is zero and the data stripe has been used; a third check value update rule corresponding to a situation where the proportion is not zero and satisfies a pre-set condition; a fourth check value update rule corresponding to a situation where the proportion is not zero and does not satisfy the pre-set condition;

wherein the first check value update rule means that the new check value of the data stripe is determined according to new state values of all the data blocks to be updated; the second check value update rule means that the new check value of the data stripe is determined according to an original check value of the data stripe and the new state values of all the data blocks to be updated; the third check value update rule means that the new check value of the data stripe is determined according to state values of data blocks not required to be updated in the data stripe and the new state values of all the data blocks to be updated; the fourth check value update rule means that the new check value of the data stripe is determined according to the original check value of the data stripe, original state values of all the data blocks to be updated and the new state values of all the data blocks to be updated.

13. The apparatus for updating a RAID 5 check value according to claim 12, wherein the processor is further configured to perform operations of:

acquiring the first check value update rule from the rule library in response to determining that all the data blocks to be updated are null in the data stripe and the data stripe has not been used;

acquiring the second check value update rule from the rule library in response to determining that all the data blocks to be updated are null in the data stripe and the data stripe has been used;

counting a first number of data blocks to be updated being null in the data stripe and a second number of data blocks to be updated being not null in the data stripe in response to determining that not all the data blocks to be updated are null in the data stripe;

acquiring the third check value update rule from the rule library in response to the first number being less than or equal to the second number; and acquiring the fourth check value update rule from the rule library in response to the first number being greater than the second number.

14. The apparatus for updating a RAID 5 check value according to claim 13, wherein in response to the check value update rule being the first check value update rule, the processor is further configured to perform operations of the processor is further configured to perform operations of:

performing an XOR operation on the new state values of all the data blocks to be updated, and taking a result of the operation as the new check value of the data stripe.

15. The apparatus for updating a RAID 5 check value according to claim 13, wherein in response to the check value update rule being the second check value update rule, the processor is further configured to perform operations of:

acquiring the original check value of the data stripe; and performing an XOR operation on the original check value and the new state values of all the data blocks to be updated, and taking a result of the operation as the new check value of the data stripe.

16. The apparatus for updating a RAID 5 check value according to claim 13, wherein in response to the check value update rule being the third check value update rule, the processor is further configured to perform operations of:

acquiring state values of data blocks not required to be updated in the data stripe; and performing an XOR operation on the state values of the data blocks not required to be updated in the data stripe and the new state values of all the data blocks to be updated in the data stripe, and taking a result of the operation as the new check value of the data stripe.

17. The apparatus for updating a RAID 5 check value according to claim 13, wherein in response to the check value update rule being the fourth check value update rule, the processor is further configured to perform operations of:

acquiring the original check value of the data stripe and the original state values of all the data blocks to be updated; and performing an XOR operation on the original check value of the data stripe, the original state values of all the data blocks to be updated and the new state values of all the data blocks to be updated, and taking a result of the operation as the new check value of the data stripe.

18. The apparatus for updating a RAID 5 check value according to claim 12, wherein the data stripe comprises a plurality of data blocks, the state value is used for characterizing whether data is stored in the data block.

* * * * *